US011959893B2

(12) United States Patent
Kozakura et al.

(10) Patent No.: US 11,959,893 B2
(45) Date of Patent: Apr. 16, 2024

(54) GAS CHROMATOGRAPH SYSTEM

(71) Applicant: SHIMADZU CORPORATION, Kyoto (JP)

(72) Inventors: Masaru Kozakura, Kyoto (JP); Hiroki Kaji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 439 days.

(21) Appl. No.: 17/294,451

(22) PCT Filed: Sep. 6, 2019

(86) PCT No.: PCT/JP2019/035192
§ 371 (c)(1),
(2) Date: May 17, 2021

(87) PCT Pub. No.: WO2020/110408
PCT Pub. Date: Jun. 4, 2020

(65) Prior Publication Data
US 2021/0404999 A1    Dec. 30, 2021

(30) Foreign Application Priority Data

Nov. 29, 2018 (JP) ................ 2018-223325

(51) Int. Cl.
*G01N 30/54*    (2006.01)
*G01N 30/02*    (2006.01)
*G01N 30/30*    (2006.01)

(52) U.S. Cl.
CPC ........... *G01N 30/54* (2013.01); *G01N 30/30* (2013.01); *G01N 2030/025* (2013.01)

(58) Field of Classification Search
None
See application file for complete search history.

(56) References Cited

U.S. PATENT DOCUMENTS 5,916,523 A    6/1999  Yan et al.
5,980,832 A *  11/1999 Andresen ............. G01N 31/005
                                                422/89

(Continued)

FOREIGN PATENT DOCUMENTS

JP    2013-068501 A    4/2013
JP    2014-095700 A    5/2014

(Continued)

OTHER PUBLICATIONS

"6.4.4 SCD: Sulfur Chemiluminescence Detector", Shimadzu Corporation, Basics of GC analysis, 6. Detector, Jun. 25, 2018, p. 3, <URL:https://www.an.shimadzu.co.jp/gc/support/faq/fundamentals/detector_02.htm>.

(Continued)

*Primary Examiner* — Peter J Macchiarolo
*Assistant Examiner* — Jermaine L Jenkins
(74) *Attorney, Agent, or Firm* — Sughrue Mion, PLLC

(57) ABSTRACT

The gas chromatograph system 10 has the gas chromatograph 1, and a detector 2. The detector 2 has the redox unit 14. The redox unit 14 has the reaction tube 142, the oxidation zone 146 and the reduction zone 147. The reduction zone 147 is disposed on the downstream side of the oxidation zone 146. The reduction zone 147 is disposed out of a position perpendicular direction above the oxidation zone 146. Hence, even if the air heated around the oxidation zone 146 moved upward by convection, the reduction zone 147 is prevented from being exposed to such hot air.

8 Claims, 6 Drawing Sheets

(56) References Cited

U.S. PATENT DOCUMENTS

| | | | | |
|---|---|---|---|---|
| 6,130,095 A | * | 10/2000 | Shearer | G01N 21/766 |
| | | | | 436/161 |
| 6,143,245 A | * | 11/2000 | Yan | G01N 21/766 |
| | | | | 422/82.07 |
| 11,262,313 B2 | * | 3/2022 | Yamane | B01L 5/00 |
| 2003/0164312 A1 | * | 9/2003 | Prohaska | G01N 27/4045 |
| | | | | 204/431 |
| 2005/0074365 A1 | * | 4/2005 | Olstowski | G01N 33/287 |
| | | | | 436/119 |
| 2014/0130580 A1 | | 5/2014 | Mcadams et al. | |
| 2020/0003695 A1 | * | 1/2020 | Horiike | B01L 3/508 |

FOREIGN PATENT DOCUMENTS

| | | |
|---|---|---|
| JP | 2015-059876 A | 3/2015 |
| JP | 2017-527811 A | 9/2017 |
| WO | 2016/039854 A1 | 3/2016 |

OTHER PUBLICATIONS

Written Opinion for PCT/JP2019/035192, dated Dec. 3, 2019.
International Search Report for PCT/JP2019/035192, dated Dec. 3, 2019.
Notice of Reasons for Refusal dated Oct. 5, 2021 from the Japanese Patent Office in JP Application No. 2020-558108.
Office Action dated Jul. 29, 2023 in Chinese Application No. 201980075815.7.

* cited by examiner

GAS CHROMATOGRAPH SYSTEM

TECHNICAL FIELD

The present invention relates to a gas chromatograph system including a column and a detector that detects a sample component isolated through the column.

BACKGROUND ART

For the purpose of quantifying content of sulfur which is a hetero atom in a sample in combination with chromatographic isolation, having been used is a detector featured by its high compound selectivity, making use of chemiluminescence. For example, a sulfur chemiluminescence detector (SCD) has been known as a detector making use of chemiluminescence of a sulfur compound (see Patent Document 1 below, for example).

According to an analysis using the SCD, for example, a sulfur compound produced by oxidation and reduction of a sulfur-containing compound reacts with ozone to produce chemiluminescence of an excited species of sulfur dioxide $SO_2^*$, and the chemiluminescence of $SO_2^*$ is detected by a detection unit constituted of a photomultiplier, and the like.

An exemplary reaction in the analysis using the SCD is as follows.

<Reaction in Redox Unit>

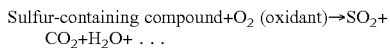
Sulfur-containing compound+$O_2$ (oxidant)→$SO_2$+ $CO_2$+$H_2O$+ . . .

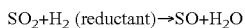
$SO_2$+$H_2$ (reductant)→$SO$+$H_2O$

<Reaction in Reaction Cell>

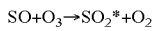
$SO$+$O_3$→$SO_2^*$+$O_2$

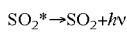
$SO_2^*$→$SO_2$+$h\nu$

A sample gas after chromatographically isolated is oxidized and reduced in a redox unit, and is then introduced into a reaction cell where chemiluminescence of $SO_2^*$ is produced, and the chemiluminescence of $SO_2^*$ is detected by the SCD.

PRIOR ART DOCUMENT

Patent Document

Patent Document 1: Japanese Patent Laid-Open No. 2015-59876

SUMMARY OF THE INVENTION

Problems to be Solved by the Invention

The aforementioned redox unit is typically provided to a gas chromatograph. The redox unit has a long reaction tube. The reaction tube is connected to one end of a column, and extends perpendicularly upward. To the reaction tube, introduced is an oxidant and a reductant. The reaction tube is heated by a heating mechanism.

When analyzed, the sample gas having passed through the column enters the reaction tube, oxidized and reduced in the reaction tube, and then introduced into the reaction cell. In this process, the sample gas is oxidized in the reaction tube in its lower zone (upstream side), and is reduced in the reaction tube in its upper zone (downstream side).

Now in the redox unit, temperature suitable for oxidation is different from temperature suitable for reduction. More specifically, the temperature suitable for oxidation is higher than the temperature suitable for reduction. For example, the temperature suitable for oxidation is 1000° C. or around, meanwhile the temperature suitable for reduction is 850° C. or around.

The reaction tube has, however, suffered from a problem that the sample gas is not easily kept at suitable temperatures for oxidation and reduction, since the reaction tube extends perpendicularly and is susceptible to convection of air. More specifically, the zone served for reduction of the sample gas (the zone of the reaction tube on the upper side) is exposed to high temperatures while being affected by the convection of air, and will be excessively hot.

In consideration of the aforementioned situations, it is therefore an object of the present invention to provide a gas chromatograph system capable of oxidizing and reducing a sample component at suitable temperatures.

Means for Solving the Problems (1) A gas chromatograph system according to the present invention is a gas chromatograph system including a column through which a sample component is introduced, and a detector that detects the sample component separated through the column. The detector includes a flow channel and a redox unit. Through the flow channel, a sample component after isolated through a column is allowed to pass. The redox unit includes an oxidation zone that oxidizes the sample component in the flow channel, and a reduction zone arranged on the downstream side of the oxidation zone in the flow channel, and reduces the sample component having been oxidized in the oxidation zone. The reduction zone is arranged not perpendicularly above the oxidation zone.

In the gas chromatograph system that aims at the redox reaction, the temperature suitable for oxidation is usually higher than the temperature suitable for reduction. In most cases, a zone served for oxidation of the sample component is kept at higher temperatures than in a zone served for reduction of the sample component.

According to the aforementioned structure of the present invention, the reduction zone that reduces the sample component is disposed on the downstream side of the oxidation zone that oxidizes the sample component. In addition, the reduction zone is disposed out of a position perpendicularly above the oxidation zone.

Hence, even if the air heated around the oxidation zone moved upward by convection, the reduction zone is prevented from being exposed to such hot air.

As a consequence, the reduction zone may be suppressed from being heated beyond a necessary level.

That is, according to the gas chromatographic detector of the present invention, the sample component may be oxidized and reduced at appropriate temperatures.

(2) The reduction zone may be juxtaposed to the oxidation zone in a substantially horizontal direction.

With such structure, the flow channel through which the sample component flows is formed so as to extend in the substantially horizontal direction.

This enables the user to maintain the flow channel in the horizontal direction.

As a consequence, workability of the user who uses the gas chromatographic detector may be improved.

(3) The gas chromatograph system may further include a flow channel member. The flow channel member is formed into a tubular form so as to constitute the flow channel. The flow channel member is detachable by sliding the flow channel member in a direction where the oxidation zone and the reduction zone are juxtaposed.

Such structure improves workability of the user who attaches or detaches the flow channel member.

(4) The gas chromatograph system may further include a body. Into the body, the column is housed. The flow channel may extend outwards from a side face of the body.

With such structure, the user can maintain the flow channel while facing himself/herself to the side face of the body.

This improves workability of the user who uses the gas chromatograph system.

(5) Further, the column may include an inlet port through which a sample is fed, and an outlet port through which the separated sample component is discharged. The flow channel having one end thereof may be connected to the outlet port of the column. The detector may further include a measurement unit, a heating unit, and a holding unit. The measurement unit measures the sample component having been oxidized and reduced in the redox unit. The heating unit heats the sample component in the flow channel in the oxidation zone, and heats the sample component in the flow channel in the reduction zone at a temperature lower than the temperature of the sample component in the oxidation zone. The holding unit holds the redox unit while keeping a posture that aligns the center axis of the flow channel to any direction other than the perpendicular direction.

With such structure, the heating unit can heat the sample component in the oxidation zone, at a temperature higher than that of the sample component in the reduction zone. The redox unit is held so that the center axis thereof is aligned in the direction other than the perpendicular direction.

Hence, even if the air heated around the oxidation zone moved upward by convection, the reduction zone is prevented from being exposed to such hot air.

As a consequence, the reduction zone may be suppressed from being heated beyond a necessary level.

(6) Further, the gas chromatograph system may further include a flow channel member. The flow channel member is a tubular member that composes the flow channel. The flow channel member may be detachable when slid in the direction the oxidation zone and the reduction zone are juxtaposed, towards the downstream side of the flow channel. The holding unit may hold the redox unit so that, assuming the horizontal direction is 0°, the reduction zone is arranged relative to the oxidation zone at an elevation of 0° or larger and 45° or smaller.

With such structure, the user can detach, by sliding, the flow channel member for maintenance.

Since the prior structure has the reaction tube extended in the perpendicular direction, the flow channel member would fall by its own weight into the redox unit, if the user's hands slipped to drop it during sliding operation for drawing it out. The flow channel member, when detached, also needs to be slid in the direction in parallel to the direction of the flow channel, so as to prevent the flow channel member from being broken. The prior structure, with the reaction tube extended in the perpendicular direction, and with the downstream side arranged upside, has made the work position high, and has made the detachment difficult.

The aforementioned structure can reduce the risk of falling of the flow channel member into the redox unit, and can improve the workability by the user who detaches the flow channel member for maintenance.

Moreover, the flow channel member can be fixed typically by allowing the reaction tube to hold it with use of an O-ring or the like. As the elevation of the reduction zone relative to the oxidation zone becomes closer to 0°, the risk of falling of the flow channel member by its own weight deep inside the redox unit will decrease, wherein an elevation of at least within 45° will supposedly make holding force of the O-ring surpass over the own weight of the flow channel member which acts in the perpendicular direction, Hence, as in the aforementioned structure, the risk of falling of the flow channel member into the redox unit can further be reduced, by allowing the holding unit to hold the reduction zone so as to be juxtaposed to the oxidation zone at an elevation of 0° or larger and 45° or smaller.

(7) Further, the inside of the flow channel member serves as the reduction zone, and may be with a catalyst having a reduction activity provided to the inner surface of the flow channel member.

With such structure, the reduction zone can be structured simply.

(8) Further, the gas chromatograph system may further include a body. Into the body, the column is housed. The redox unit may be arranged on the side face of the body. The flow channel may extend outwards from a side face of the body.

With such structure, the user can maintain the flow channel while facing himself/herself to the side face of the body. Workability of the user, when using the gas chromatograph system, can be thus improved. Moreover, since the redox unit is not arranged right above the body, so that the redox unit may be prevented from being affected through convection by the temperature inside the body.

Effects of the Invention

According to the present invention, the reduction zone that reduces the sample component is disposed on the downstream side of the oxidation zone that oxidizes the sample component. In addition, the reduction zone is disposed out of a position perpendicularly above the oxidation zone. Hence, even if the air heated around the oxidation zone moved upward by convection, the reduction zone is prevented from being exposed to such hot air. As a consequence, the reduction zone may be suppressed from being heated beyond a necessary level. That is, according to the gas chromatographic detector of the present invention, the sample component may be oxidized and reduced at appropriate temperatures.

MODE FOR CARRYING OUT THE INVENTION

1. Structure of Gas Chromatograph System

Figure 1:
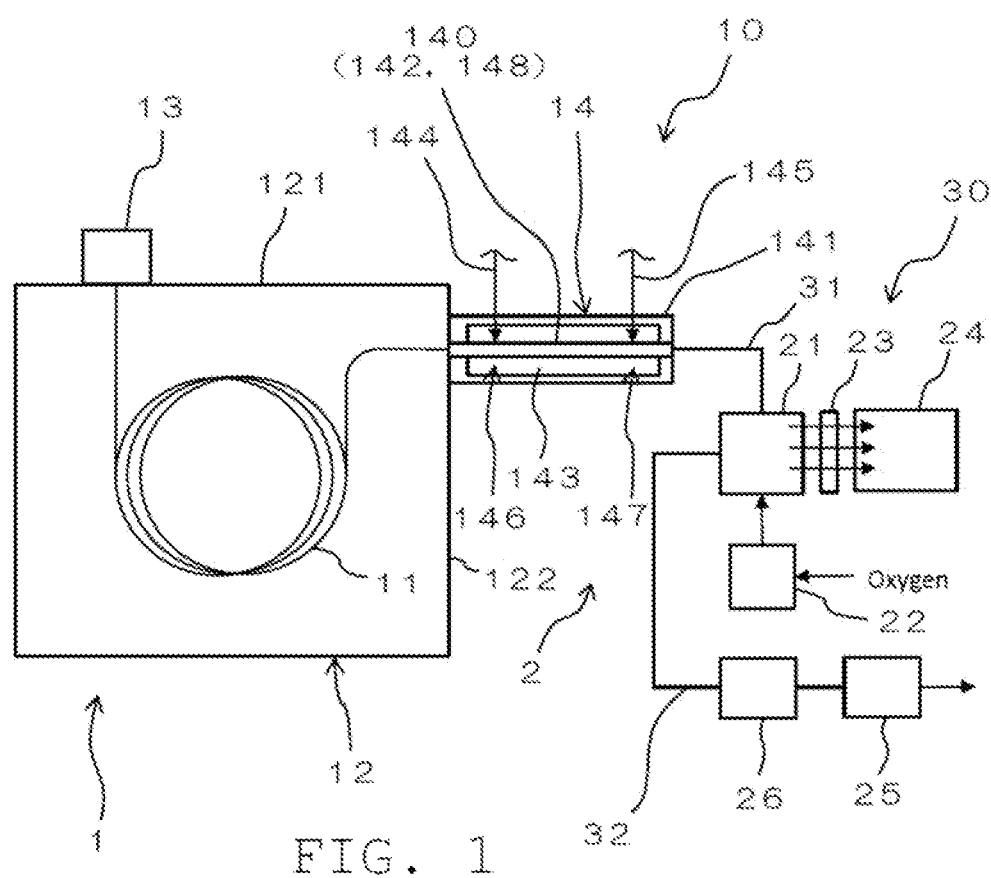
FIG. 1 is a schematic drawing illustrating an exemplary structure of a gas chromatograph system using a gas chromatograph according to a first embodiment of the present invention.

FIG. 1 is a schematic drawing illustrating an exemplary structure of a gas chromatograph system 10 using a gas chromatograph 1 according to a first embodiment of the present invention.

The gas chromatograph system 10 has the gas chromatograph 1, and a detector 2 that detects a sample component isolated through the gas chromatograph 1.

The gas chromatograph 1 has a column 11, a column oven 12, a sample injection port 13 and so forth.

The column 11 is typically constituted of a capillary column. The column 11 is housed in the column oven 12, together with a heater, a fan and so forth (all not illustrated).

The column oven 12 has a box shape. The column oven 12 is aimed at heating the column 11. The heater and the fan (not illustrated) are appropriately operated during analysis. The column oven 12 constitutes an example of the body.

The sample injection port 13 is provided to a top face 121 of the column oven 12. The sample injection port 13 has inside a sample gasification chamber. A sample (sample gas) gasified in the sample gasification chamber is injected together with a carrier gas into the column 11.

The detector 2 is an SCD for example. The detector 2 has a redox unit 14, a reaction cell 21, an ozonizer 22, a filter 23, a photodetector 24, a pump 25, a scrubber 26 and so forth. The detector 2 constitutes an example of the gas chromatographic detector.

The redox unit 14 is provided to a circumferential face (side face 122) of the column oven 12. The redox unit 14 is aimed at subjecting the sample component to redox reaction. To the redox unit 14, connected is one end (front end) of the column 11. Detailed structure of the redox unit 14 will be described later.

To the reaction cell 21, individually connected are a first transfer tube 31 and a second transfer tube 32. The reaction cell 21 is connected through the first transfer tube 31 to the redox unit 14. To the reaction cell 21, ozone is fed from the ozonizer 22.

In the ozonizer 22, ozone is produced from oxygen by silent electric discharge. The ozonizer 22 and the photodetector 24 are spaced from each other. A filter 23 is disposed between the reaction cell 21 and the photodetector 24.

The photodetector 24 is typically constituted of photomultiplier. The reaction cell 21, the ozonizer 22, the filter 23 and the photodetector 24 compose a measurement unit 30. The measurement unit 30 measures the sample component oxidized and reduced by the redox unit 14.

The pump 25 and the scrubber 26 are connected by the second transfer tube 32.

When analyzing a sample using the gas chromatograph system 10, first, the sample to be analyzed is injected through the sample injection port 13 of the gas chromatograph 1. The sample is gasified in the sample gasification chamber. Into the sample gasification chamber of the sample injection port 13, also a carrier gas is fed.

The sample gasified in the sample gasification chamber is injected together with the carrier gas into the column 11. The individual sample components contained in the sample are isolated as they pass through the column 11, and sequentially injected into the redox unit 14.

In the redox unit 14, redox reactions of the sample components proceed. The sample components (sample gas) injected from the redox unit 14 through the first transfer tube 31 into the reaction cell 21 are mixed, in the reaction cell 21, with ozone fed from the ozonizer 22.

Now, introduction of the sample gas from the redox unit 14 into the reaction cell 21 is effected by an action of the pump 25 that is connected through the second transfer tube 32 to the reaction cell 21. More specifically, the sample gas is introduced by an aspirating action of the pump 25, from the redox unit 14 into the reaction cell 21, and the sample gas after reacted with ozone in the reaction cell 21 is discharged through the pump 25. The scrubber 26 is interposed between the reaction cell 21 and the pump 25. The sample gas output from the reaction cell 21 is deozonized by the scrubber 26 and then discharged.

In the reaction cell 21, excited sulfur dioxide is produced, which is observable by its chemiluminescence. The chemiluminescence that occurred in the reaction cell 21 is detected through the filter 23 by the photodetector 24. The photodetector 24 outputs a signal corresponding to the intensity of chemiluminescence of sulfur dioxide, and sulfur content can be quantified on the basis of the thus detected signal.

2. Structure of Detector

The redox unit 14 is provided to the side face 122 of the column oven 12. The redox unit 14 has a body part 141, a first reaction tube 142, a second reaction tube 148 and a heating unit 143. The body part 141 has a long cylindrical shape, and extends from the side face 122 of the column oven 12 in a substantially horizontal direction.

Note that the side face 122 of the column oven 12 means a circumferential face of the column oven 12, which is a face neighboring to (continued from) a face (front face) that opposes to the user.

The first reaction tube 142 has a tubular shape, and is disposed in the body part 141. The first reaction tube 142 extends from the side face 122 of the column oven 12 in the substantially horizontal (outward) direction. The first reaction tube 142 is slidable (detachable) along the body part 141 in the substantially horizontal direction. One end (front end) of the column 11 is connected to the second reaction tube 148. The first reaction tube 142 is connected to the first transfer tube 31. The first reaction tube 142 is typically a ceramic tube. To an upstream zone (a part closer to the column 11) of the second reaction tube 148, a first inlet tube 144 is connected. Meanwhile, to a downstream zone (a part closer to the reaction cell 21) of the first reaction tube 142, a second inlet tube 145 is connected. The first reaction tube 142 constitutes an example of the flow channel member. Meanwhile, a space in the first reaction tube 142 and the second reaction tube 148 constitutes an example of the flow channel.

Through the first inlet tube 144, an oxidant is fed from an unillustrated supply unit. The oxidant is typically $O_2$, but may be a substance other than $O_2$. A portion in the second reaction tube 148 at and around where the first inlet tube 144 is connected serves as an oxidation zone 146.

Through the second inlet tube 145, a reductant is fed from an unillustrated supply unit. The reductant is typically $H_2$, but not limited thereto. An inner portion of the first reaction tube 142 is a reduction zone 147.

More specifically, in the redox unit 14, the reduction zone 147 is juxtaposed to the oxidation zone 146 in the substantially horizontal direction. The reduction zone 147 is disposed in the flow channel 140, on the downstream side (on the downstream side in the direction the sample gas comes in) of the oxidation zone 146.

The heating unit 143 is disposed in the body part 141 so as to cover the first reaction tube 142 and the second reaction tube 148. The heating unit 143 typically has a heater (not illustrated). The heating unit 143 heats the oxidation zone 146 and the reduction zone 147. More specifically, the heating unit 143 heats each of the oxidation zone 146 and the reduction zone 147, so as to make the oxidation zone 146 hotter than the reduction zone 147.

3. Redox Reaction of Sample in Redox Unit

As described above, the sample gas after passed through the column 11 of the gas chromatograph 1 is injected into the redox unit 14. Now, the sample gas after passed through the column 11 is injected into the flow channel 140.

The sample gas injected into the flow channel 140 is, first, mixed in the oxidation zone 146 with the oxidant that is fed through the first inlet tube 144, and heated by the heating unit 143. More specifically, the oxidation zone 146 is heated up to 1000° C. or around. The sample gas is oxidized in this way in the oxidation zone 146.

The oxidized sample gas further moves in the substantially horizontal direction in the flow channel 140, and reaches the reduction zone 147. The sample gas is then mixed in the reduction zone 147 with the reductant that is fed through the second inlet tube 145, and heated by the heating unit 143. More specifically, the reduction zone 147 is heated up to 850° C. or around. The sample gas is reduced in this way in the reduction zone 147.

In this way, the redox reaction of the sample gas (sample component) is allowed to proceed in the redox unit 14. The sample gas (sample component) is then introduced through the first transfer tube 31 into the reaction cell 21.

For example, a sulfur-containing compound, which is an example of the sample component in the sample gas, is oxidized in the redox unit 14 using $O_2$ as an oxidant to produce $SO_2$. The thus produced $SO_2$ is reduced in the redox unit 14 using $H_2$ as a reductant to produce SO. The thus produced SO is a sulfur compound capable of causing chemiluminescence upon being reacted with ozone.

In the process of redox reaction of the sample component within the redox unit 14, the circumference of the second reaction tube 148 will be heated to high temperatures due to heating by the heating unit 143. The air heated to high temperatures around the second reaction tube 148 ascends by convection. Meanwhile, the reduction zone 147 in the first reaction tube 142 is spaced from the oxidation zone 146 in the substantially horizontal direction. The reduction zone 147 is therefore prevented from being exposed to hot air heated around the oxidation zone 146.

The first reaction tube 142 is a consumable item, and needs to be replaced if the activity changed due to temporal degradation or contamination, which appears as declined sensitivity to the sample component. In this case, the user who stands facing the side face 122 of the gas chromatograph 1 can slide the first reaction tube 142 in the substantially horizontal direction with respect to the body part 141, so as to pull out (detach) the first reaction tube 142 from the redox unit 14. Then the user can attach a new first reaction tube 142 to the redox unit 14, by sliding the new first reaction tube 142 so as to insert it to the body part 141.

4. Detailed Structure of Detector

Figure 2:
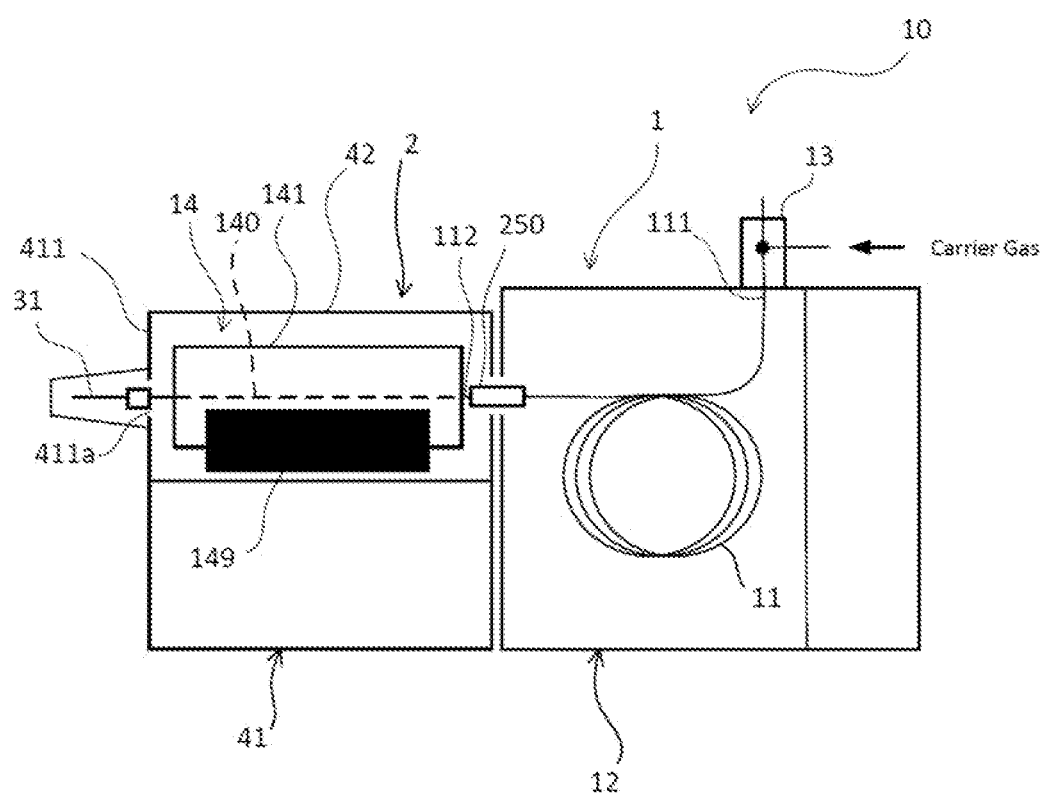
FIG. 2 is a front elevation schematically illustrating an internal structure of the gas chromatograph system of FIG. 1.
Figure 3:
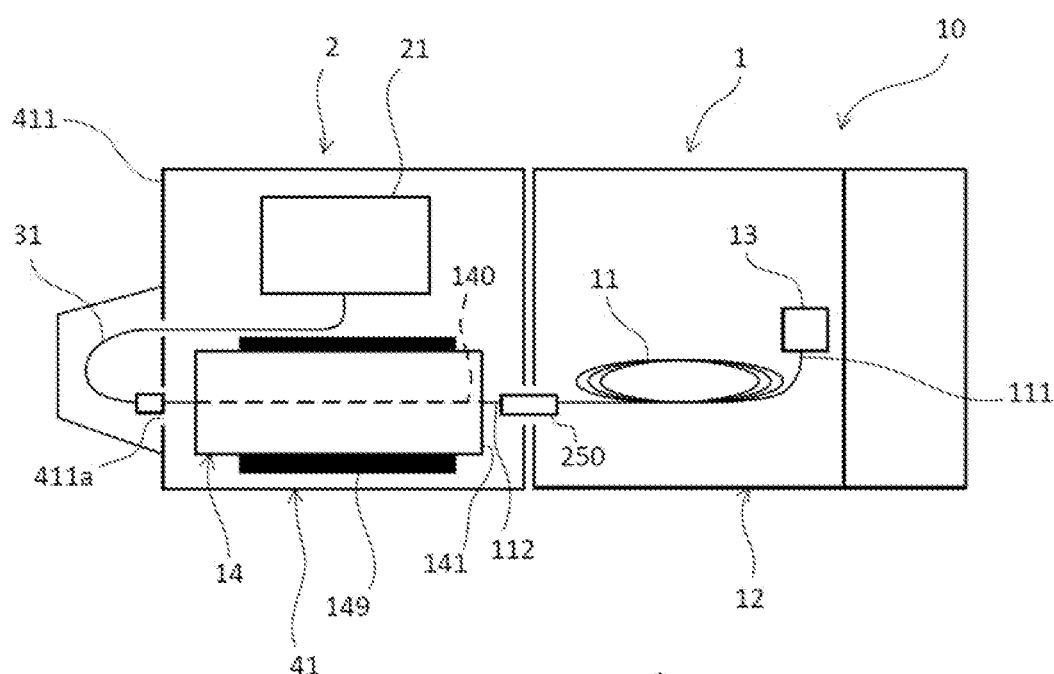
FIG. 3 is a plan view schematically illustrating the internal structure of the gas chromatograph system of FIG. 1.
Figure 4:
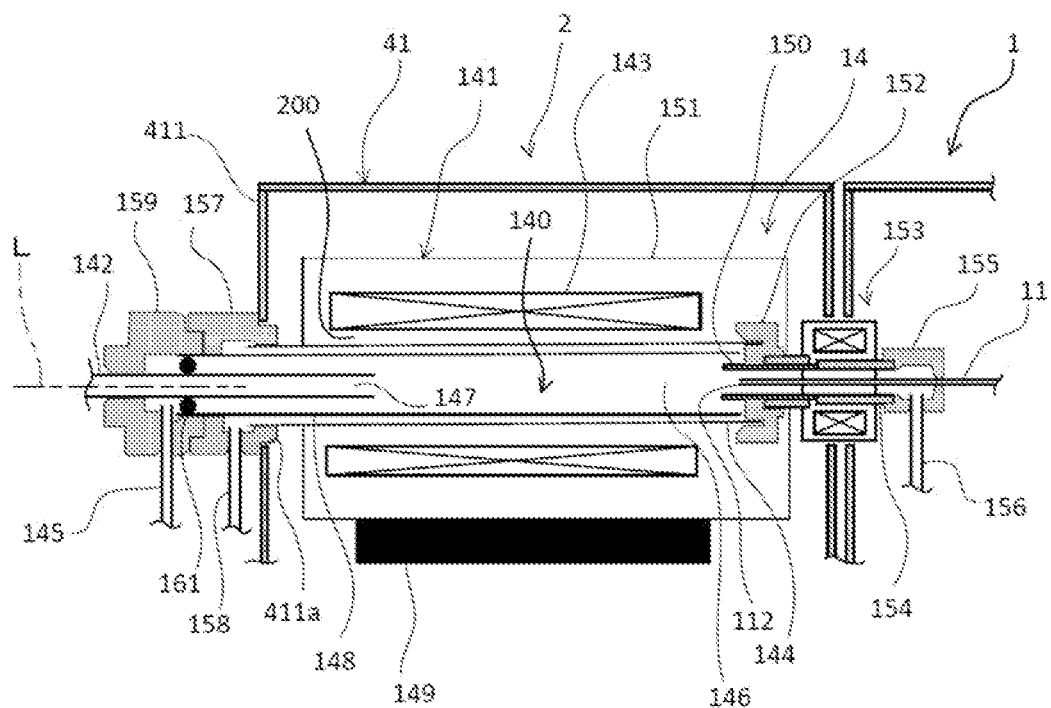
FIG. 4 is a cross sectional view detailing a peripheral structure of a redox unit of the gas chromatograph system of FIG. 1.

FIG. 2 is a front elevation schematically illustrating an internal structure of the gas chromatograph system 10. FIG. 3 is a plan view schematically illustrating the internal structure of the gas chromatograph system 10. FIG. 4 is a cross sectional view detailing a peripheral structure of the redox unit 14 of the gas chromatograph system 10.

As illustrated in FIGS. 2 and 3, the flow channel 140 in the gas chromatograph system 10 extends outwards from the side face of the column oven 12, and the redox unit 14 is arranged on the side face of the column oven 12. In the gas chromatograph 10, one end of the flow channel 140 is connected to the outlet port 112 of the column 11.

In the gas chromatograph 1, the sample is injected through a sample injection port 13 into flow of a carrier gas, and the carrier gas that contains the sample is injected through an inlet port 111 of the column 11 housed in the column oven 12. The sample is separated into the individual ingredients in the course of passage through the column 11, and the gas that contains the thus separated individual sample components (referred to as "sample gas", hereinafter) is sequentially eluted through the outlet port 112 of the column 11.

In the detector 2, the body part 141 is housed in the upper front side of an enclosure 41 of the detector 2, meanwhile the reaction cell 21 and the other constituents (not illustrated in FIGS. 2 and 3) are housed in the residual space inside the enclosure 41 (for example, under or behind the body part 141). Note that, the enclosure 41 of the detector 2 has an openable/closable door 42 provided to the top face thereof, locally above the space in which the body part 141 is contained.

As illustrated in FIG. 4, the body part 141 has the first reaction tube 142, the second reaction tube 148, the first inlet tube 144, an inert gas feed tube 150, the heating unit 143, and a housing 151 that houses these components. In the description below, the ends of the individual tubes that reside on the left side of FIG. 4 will be referred to as "left ends" of the individual tubes, and the ends that reside on the right side of the drawing will be referred to as "right ends" of the individual tubes.

The second reaction tube 148 is arranged in the first inlet tube 144 concentrically with the first inlet tube 144, and the inert gas feed tube 150 has its left end inserted into the right end of the second reaction tube 148. The first reaction tube 142 has its right end inserted into the left end of the second reaction tube 148. Note that all of the second reaction tube 148, the first reaction tube 142, the first inlet tube 144, and the inert gas feed tube 150 are ceramic tubes composed of ceramic such as alumina.

The first inlet tube 144 and the second reaction tube 148 have, at the right ends thereof, a connector 152 attached thereto, and the inert gas feed tube 150 is inserted through the connector 152. Although the right-end opening parts of the first inlet tube 144 and the second reaction tube 148 are closed with the connector 152, the connector 152 has a groove formed on the left end face thereof, through which gas can flow between the first inlet tube 144 and the second reaction tube 148. The right end of the inert gas feed tube 150 protrudes out from the housing 151 of the body part 141, and is connected to the left end of a tube 154 provided inside an interface 153 arranged at the boundary between the gas chromatograph 1 and the detector 2. The right end of the tube 154 is attached to a first joint 155. The first joint 155 has, connected thereto, an inert gas flow channel 156 through which an inert gas (nitrogen, in this case) is fed to the inert gas feed tube 150.

The left ends of the first reaction tube 142, the first inlet tube 144 and the second reaction tube 148 protrude out from the housing 151 of the body part 141, and further protrude out from an opening 411a provided to the left side wall 411 of the enclosure 41 of the detector 2. Outside of the enclosure 41, the first inlet tube 144 has a second joint 157 attached to the left end, and to the second joint 157, connected is an oxidant flow channel 158 through which an oxidant (oxygen, in this case) is fed to the first inlet tube 144. The second reaction tube 148 is inserted through the second joint 157, and has a third joint 159 attached to the left end. To the third joint 159, connected is a second inlet tube 145 through which a reducing agent (hydrogen, in this case) is fed to the second reaction tube 148. The first reaction tube 142 is inserted through the third joint 159, and is connected, at the left end thereof, to the first transfer tube 31 that leads to the reaction cell 21. The first transfer tube 31 is composed of a flexible tube, which is turned around outside of the enclosure 41, again returned into the enclosure 41, and connected to the reaction cell 21 inside the enclosure 41.

The first reaction tube 142 has, on the inner surface thereof, a catalyst with reducing activity. The inside of the first reaction tube 142 (a flow channel having a tubular form) composes the reduction zone 147. Between the first reaction tube 142 and the third joint 159, there is provided an O-ring 161. The first reaction tube 142 is held by the second reaction tube 148 while placing the O-ring 161 in between. The first reaction tube 142 is attachable to and detachable from the detector 2, by the user sliding the first reaction tube 142 in the direction the oxidation zone 146 and the reduction zone 147 are juxtaposed, towards the downstream side of the flow channel 140.

The detector 2 has provided thereto a holding unit 149 for holding the body part 141 (redox unit 14). The holding unit 149 is fixed to a certain position in the enclosure 41, and holds the bottom end of the body part 141. The body part 141 (redox unit 14) is thus kept in a predetermined posture.

The holding unit 149 holds the body part 141 (redox unit 14) so that, assuming the horizontal direction is 0°, the reduction zone 147 is arranged relative to the oxidation zone 146 at an elevation of 0° or larger and 45° or smaller.

More specifically in this embodiment, assuming the horizontal direction is 0°, the holding unit 149 holds the body part 141 (redox unit 14) so that the reduction zone 147 is arranged relative to the oxidation zone 146 at an elevation of 0° or larger and 5° or smaller. In this state, the reduction zone 147 is juxtaposed to the oxidation zone 146 in the substantially horizontal direction. That is, a state of arrangement of the reduction zone 147 juxtaposed to the oxidation zone 146 in the substantially horizontal direction includes a case where, assuming the horizontal direction is 0°, the reduction zone 147 is arranged relative to the oxidation zone 146 at an elevation of 0° or larger and 5° or smaller.

Note that the holding unit 149 may only hold the redox unit 14 while keeping a posture that aligns the center axis L of the flow channel to any direction other than the perpendicular direction. That is, the reduction zone 147 may only be juxtaposed to the oxidation zone 146 at an elevation other than the perpendicular direction.

The heating unit 143 heats the sample component in the flow channel 140 in the oxidation zone 146, and heats the sample component in the flow channel 140 in the reduction zone 147 at a temperature lower than the temperature of the sample component in the oxidation zone 146.

Nitrogen fed through the inert gas flow channel 156 flows through the first joint 155 and the tube 154 into the right end (rear end) of the inert gas feed tube 150, and advances inside the inert gas feed tube 150 from the right end (rear end) to the left end (front end).

Oxygen fed through the oxidant flow channel 158 flows through the second joint 157 into the left end of the first inlet tube 144, and advances rightwards in a space between the inner wall of the first inlet tube 144 and the outer wall of the second reaction tube 148. Oxygen that reaches the right end of the first inlet tube 144 flows through the groove (described previously) formed on the left end face of the connector 152 into the second reaction tube 148, and advances leftwards inside the second reaction tube 148. Although this embodiment is specified to use oxygen as the oxidant, air may alternatively be used as the oxidant.

Hydrogen fed through the second inlet tube 145 flows through the third joint 159 into the left end of the second reaction tube 148, and advances rightwards through in a space between the inner wall of the second reaction tube 148 and the outer wall of the first reaction tube 142. Hydrogen that reaches close to the right end of the first reaction tube 142 is then taken up into the first reaction tube 142, and advances leftwards inside the first reaction tube 142.

The sample gas introduced into the body part 141 through the outlet port 112 of the column 11 of the gas chromatograph 1 is mixed with oxygen at the right end of the second reaction tube 148, and is oxidatively decomposed at high temperatures, while advancing leftwards inside the second reaction tube 148. If the sample component in this process is sulfur compound, producible is sulfur dioxide. The gas that contains the sample component having been oxidatively decomposed is then taken up into the first reaction tube 142, together with hydrogen fed around the left end of the second reaction tube 148. If sulfur dioxide is contained in the oxidatively decomposed sample component, sulfur dioxide in this timing reacts with hydrogen to be reduced into sulfur monoxide. The gas passed through the first reaction tube 142 is introduced through the first transfer tube 31 into the reaction cell 21.

The gas fed through the first transfer tube 31 into the reaction cell 21 is mixed with ozone in the reaction cell 21, as illustrated in FIG. 1. Chemiluminescence that occurs in this process as a result of reaction between sulfur monoxide and ozone is detected through the filter 23 by the photodetector 24 that typically contains a photomultiplier or the like. A signal detected by the photodetector 24 is sent to a controller (not illustrated), and on the basis of which, concentration of the sulfur compound in the sample gas is determined. In this way, the sample component oxidized and reduced in the redox unit 14 may be measured in the measurement unit 30.

The column oven 12 during such analysis may undergo large temperature change, which may even vary typically between −30 to 480° C. within 30 minutes. Although a region 200 between the second reaction tube 148 and the heating unit 143 will have convection therein, the reduction zone 147 is not arranged above the region 200, and this makes it possible to suppress the reduction zone 147 from becoming excessively hot.

For maintenance, the user can draw (detach) the first reaction tube 142 out from the redox unit 14, by sliding the first reaction tube 142. Since the reduction zone 147 is arranged relative to the oxidation zone 146 at an elevation of 0° or larger and 45° or smaller, so that a risk of falling of the first reaction tube 142 by its own weight into the redox unit 14 may be reduced, and workability of the user during the maintenance may be improved. This embodiment, having the reduction zone 147 juxtaposed to the oxidation zone 146 in the substantially horizontal direction, can further improve workability of the user during the maintenance.

Note that the horizontal direction in this embodiment means any direction contained in a plane orthogonal to the direction of gravity. Moreover in this embodiment, the angle that specifies a positional relation between the oxidation zone 146 and the reduction zone 147 is given by an angle between the center axis of the flow channel 140 between the oxidation zone 146 and the reduction zone 147, and a plane orthogonal to the direction of gravity.

5. Operations and Effects (1) According to this embodiment, the gas chromatograph system 10 has the gas chromatograph 1 and the detector 2 as illustrated in FIG. 1. The detector 2 has the redox unit 14. The redox unit 14 has the oxidation zone 146 and the reduction zone 147. The reduction zone 147 is disposed on the downstream side of the oxidation zone 146. The reduction zone 147 is disposed out of a position perpendicularly above the oxidation zone 146.

Hence, even if the air heated around the oxidation zone 146 moved upward by convection, the reduction zone 147 is prevented from being exposed to such hot air.

As a consequence, the reduction zone 147 may be suppressed from being heated beyond a necessary level.

That is, according to the redox unit 14, the sample component may be oxidized and reduced at appropriate temperatures.

(2) According to this embodiment, as illustrated in FIG. 1, the reduction zone 147 is juxtaposed to the oxidation zone 146 in the substantially horizontal direction in the redox unit 14.

That is, in the redox unit 14, the flow channel 140 (the flow channel 140 in the first reaction tube 142) through which the sample component flows is formed so as to extend in the horizontal direction.

This enables the user to maintain the flow channel in the horizontal direction.

As a consequence, workability of the user who uses the redox unit 14 may be improved.

Also degree of freedom in designing the flow channel in the gas chromatograph 1 may be improved.

(3) According to this embodiment, the redox unit 14 has the first reaction tube 142 as illustrated in FIG. 1. The first reaction tube 142 is attachable and detachable to and from the body part 141, if slid in the direction (substantially horizontal direction) the oxidation zone 146 and the reduction zone 147 are juxtaposed.

This improves workability of the user who attaches and detaches the first reaction tube 142 to and from the body part 141.

(4) According to this embodiment, in the gas chromatograph 1, the first reaction tube 142 extends outward from the side face 122 of the column oven 12, as illustrated in FIG. 1.

Hence, the user can maintain the first reaction tube 142 (the flow channel 140 of the first reaction tube 142) while facing himself/herself to the side face 122 of the column oven 12.

As a result, this improves workability of the user who uses the gas chromatograph 1.

(5) According to this embodiment, in the gas chromatograph system 10, the heating unit 143 heats the sample component in the flow channel 140 in the oxidation zone 146, and heats the sample component in the flow channel 140 in the reduction zone 147 at a temperature lower than the temperature of the sample component in the oxidation zone 146. The holding unit 149 holds the redox unit 14 while keeping a posture that aligns the center axis L of the flow channel 140 to any direction other than the perpendicular direction.

Hence, even if the air heated around the oxidation zone 146 moved upward by convection, the reduction zone 147 is prevented from being exposed to such hot air.

As a consequence, the reduction zone 147 may be suppressed from being heated beyond a necessary level.

(6) According to this embodiment, in the gas chromatograph system 10, the first reaction tube 142 is detachable by sliding it in the direction the oxidation zone 146 and the reduction zone 147 are juxtaposed, towards the downstream side of the flow channel 140. The holding unit 149 holds the redox unit 14 so that, assuming the horizontal direction is 0°, the reduction zone 147 is arranged relative to the oxidation zone 146 at an elevation of 0° or larger and 45° or smaller.

Hence, the user can detach, by sliding, the first reaction tube 142 for maintenance.

If the first reaction tube 142 were designed to extend in the perpendicular direction, the first reaction tube 142 would fall by its own weight into the redox unit 14, typically due to slipping off from hands when drawn out by sliding. The first reaction tube 142, when detached, also needs to be slid in the direction in parallel to the direction of the flow channel, so as to prevent the first reaction tube 142 from being broken. Hence, the structure, with the first reaction tube 142 extended in the perpendicular direction, and consequently with the downstream side of the first reaction tube 142 arranged upside, make the work position high, and make the detachment difficult.

The structure of the present embodiment can reduce the risk of falling of the first reaction tube 142 into the redox unit 14, and can improve the workability by the user who detaches the first reaction tube 142 for maintenance.

As the elevation of the reduction zone 147 relative to the oxidation zone 146 becomes closer to 0°, the risk of falling of the first reaction tube 142 by its own weight deep inside the redox unit 14 will decrease, wherein an elevation of at least within 45° will supposedly make holding force of the O-ring 161 surpass over the own weight of the first reaction tube 142 which acts in the perpendicular direction.

Hence, the risk of falling of the first reaction tube 142 into the redox unit 14 can further be reduced, by allowing the holding unit 149 to hold the redox unit 14 so that the reduction zone 147 is juxtaposed to the oxidation zone 146 at an elevation of 0° or larger and 45° or smaller.

(7) Further, according to the present embodiment, the inside of the first reaction tube 142 serves as the reduction zone 147. Furthermore, a catalyst having a reduction activity may be provided to the inner surface of the first reaction tube 142.

The reduction zone 147 may therefore be structured simply.

(8) According to this embodiment, the redox unit 14 in the gas chromatograph system 10 is arranged on the side face of the column oven 12 as illustrated in FIGS. 2 and 3. The flow channel 140 extends outwards from the side face of the column oven 12.

The user can therefore maintain the flow channel 140, while facing himself/herself to the side face of the column oven 12, making it possible to improve workability of the user when using the gas chromatograph system 10. Since the redox unit 14 is not arranged right above the column oven 12, so that the column oven 12 may be prevented from being affected through convection by the temperature inside the column oven 12.

The column oven 12 during measurement may undergo large temperature change, which may even vary typically between −30 to 480° C. within 30 minutes. Therefore in a case where the redox unit 14 is arranged right above the column oven 12, rather than on the side face thereof, the ambient temperature of the redox unit 14 may extremely vary, making it difficult to accurately control the temperature inside the redox unit 14 given by the heating unit 143.

The structure of this embodiment, in which the redox unit 14 is not arranged right above the column oven 12, can suppress the convection from occurring during the measurement, between the column oven 12 and the redox unit 14.

6. Second Embodiment

Another embodiment of the present invention will be explained below, referring to FIGS. 5 and 6. Note that all constituents similar to those in the first embodiment will be given the same reference signs, so as to avoid repetitive explanation.

Figure 5:
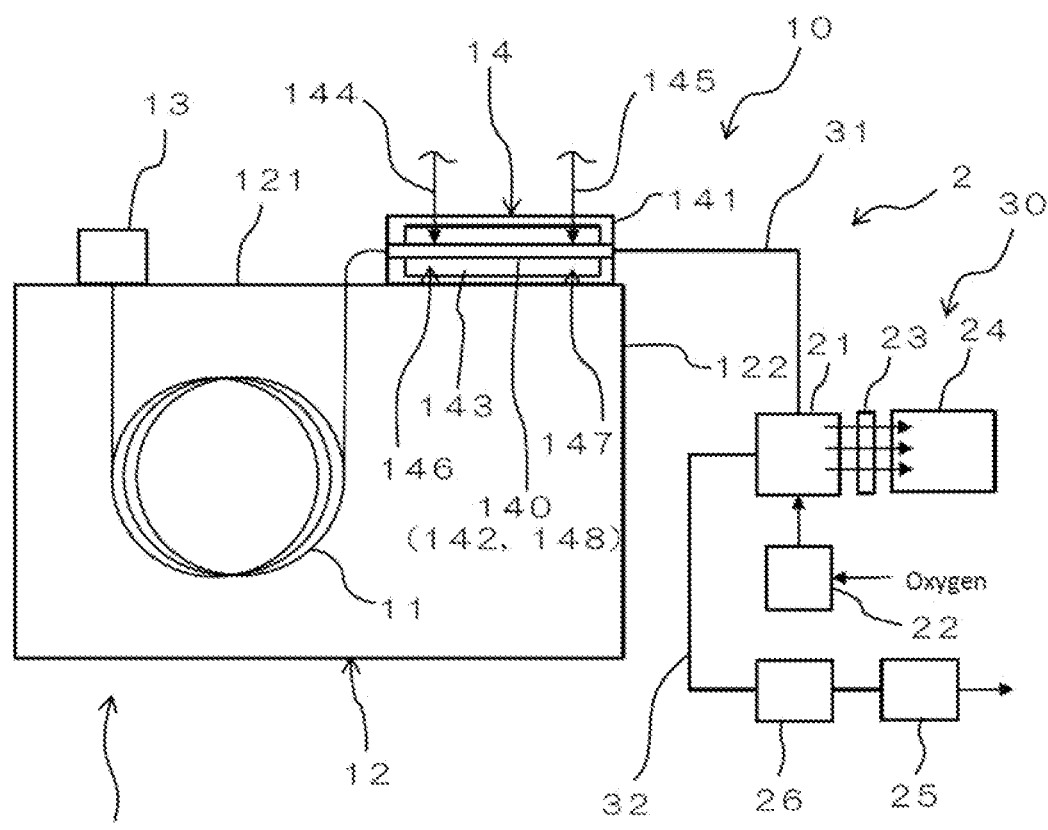
FIG. 5 is a schematic drawing illustrating an exemplary structure of a gas chromatograph system using a gas chromatograph according to a second embodiment of the present invention.

FIG. 5 is a schematic drawing illustrating an exemplary structure of a gas chromatograph system 10 using a gas chromatograph 1 according to a second embodiment of the present invention.

In the aforementioned first embodiment, the redox unit 14 was provided to the side face 122 of the column oven 12.

In contrast, the redox unit 14 in the second embodiment is provided to the top face 121 of the column oven 12. More specifically, the redox unit 14 is placed on the top face 121 of the column oven 12, while keeping the flow channel 140 extended in the substantially horizontal direction. In this state, the reduction zone 147 is juxtaposed to the oxidation zone 146 in the substantially horizontal direction.

With such disposition of the redox unit 14, a space can be reserved beside the side face 122 of the gas chromatograph 1.

7. Third Embodiment

Figure 6:
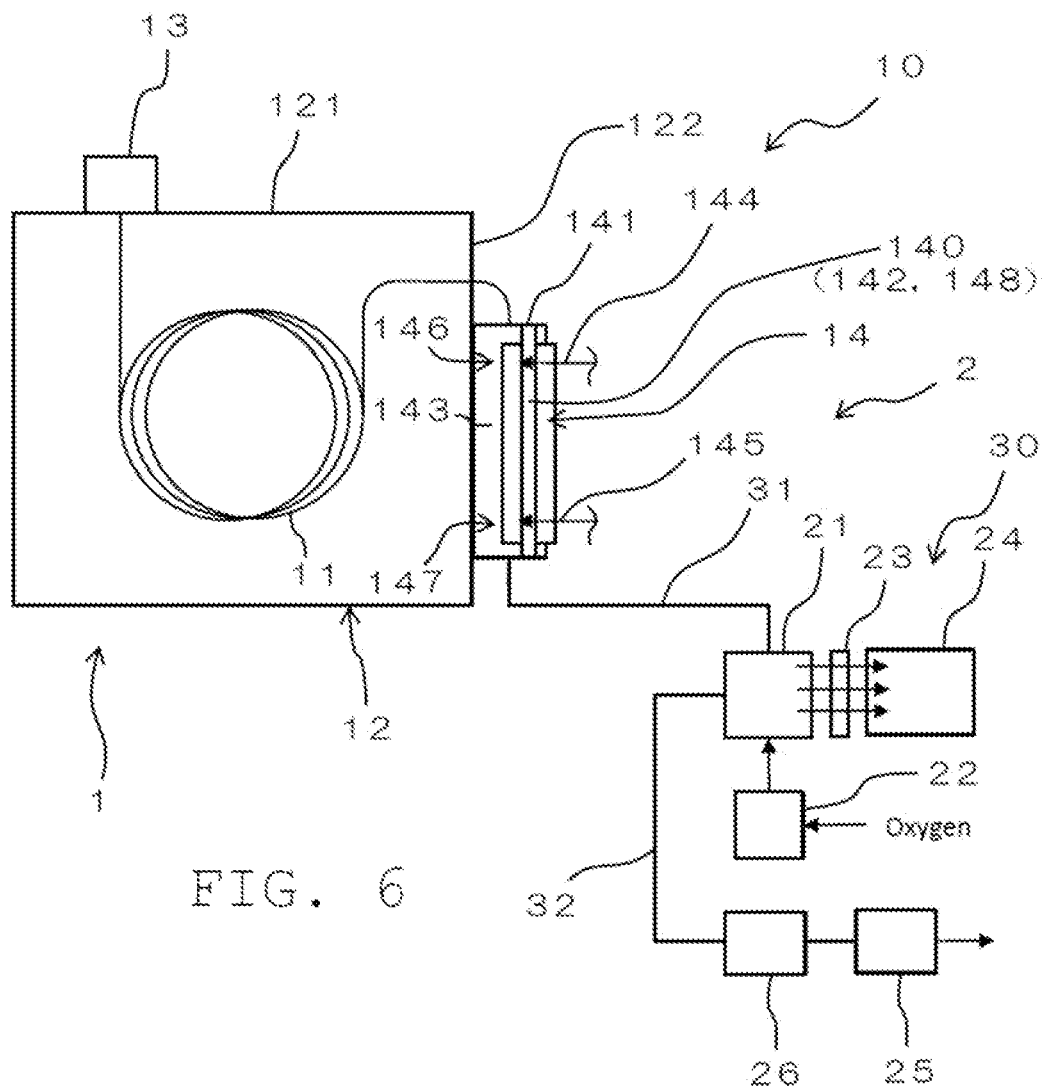
FIG. 6 is a schematic drawing illustrating an exemplary structure of a gas chromatograph system using a gas chromatograph according to a third embodiment of the present invention.

FIG. 6 is a schematic drawing illustrating an exemplary structure of a gas chromatograph system 10 using a gas chromatograph 1 according to a third embodiment of the present invention.

In the aforementioned first embodiment, the redox unit 14 was provided while keeping the flow channel 140 extended in the substantially horizontal direction.

In contrast, the redox unit 14 in the third embodiment is provided while keeping the flow channel 140 extended perpendicularly. More specifically, the redox unit 14 is provided to the side face 122 of the column oven 12, while keeping the flow channel 140 extended perpendicularly. The redox unit 14 is disposed along the side face 122 of the column oven 12.

In this state, the reduction zone 147 is disposed below the oxidation zone 146.

Hence, even if the air heated around the oxidation zone 146 moved upward by convection, the reduction zone 147 prevented from being exposed to such hot air.

As a consequence, the reduction zone 147 may be kept at an appropriate temperature.

8. Modified Example

The reduction zone 147 explained in the aforementioned embodiments was disposed so as to be spaced from the oxidation zone 146 in the horizontal direction, or disposed below the oxidation zone 146. The reduction zone 147 will, however, suffice if it is disposed out of a position perpendicularly above the oxidation zone 146, so that the disposition is not limited to those described above. For example, the reduction zone 147 may be disposed obliquely to the oxidation zone 146 (spaced from the oxidation zone 146 both perpendicularly and horizontally).

DESCRIPTION OF REFERENCE SIGNS 1 gas chromatograph
2 detector
10 gas chromatograph system
11 column
12 column oven
14 redox unit
30 measurement unit
111 inlet port
112 outlet port
122 side face
140 flow channel
142 first reaction tube
143 heating unit
146 oxidation zone
147 reduction zone
148 second reaction tube
149 holding unit
161 O-ring
L center axis

The invention claimed is:

1. A gas chromatograph system comprising:
    a column through which a sample component is introduced;
    a column oven that houses the column; and
    a detector that detects the sample component separated through the column,
    the detector comprising;
    a flow channel through which the sample component separated through the column passes; and
    a redox unit comprising an oxidation zone that oxidizes the sample component in the flow channel; and a reduction zone arranged on the downstream side of the oxidation zone in the flow channel, and reduces the sample component having been oxidized in the oxidation zone,
    wherein the redox unit is attached to the column oven with a positional relation that the reduction zone being arranged not perpendicularly above the oxidation zone.

2. The gas chromatograph system according to claim 1, wherein the reduction zone is juxtaposed to the oxidation zone in a substantially horizontal direction.

3. The gas chromatograph system according to claim 1, further comprising a tubular flow channel member that constitutes the flow channel,
    wherein the flow channel member is detachable by sliding the flow channel member in a direction where the oxidation zone and the reduction zone are juxtaposed.

4. The gas chromatograph system according to claim 1, further comprising a body that houses the column,
    wherein the flow channel extends outwards from a side face of the column oven body.

5. The gas chromatograph system according to claim 1, wherein the column comprising an inlet port through which a sample is fed, and an outlet port through which the separated sample component is discharged,
    the flow channel having one end thereof connected to the outlet port of the column,
    the detector further comprising:
    a measurement unit that measures the sample component having been oxidized and reduced in the redox unit,
    a heating unit that heats the sample component in the flow channel in the oxidation zone, and heats the sample component in the flow channel in the reduction zone at a temperature lower than the temperature of the sample component in the oxidation zone; and a holding unit that holds the redox unit while keeping a posture that aligns the center axis of the flow channel to any direction other than the perpendicular direction.

6. The gas chromatograph system according to claim 5, further comprising a tubular flow channel member that composes the flow channel, the flow channel member being detachable when slid in the direction the oxidation zone and the reduction zone are juxtaposed, towards the downstream side of the flow channel; and the holding unit holds the redox unit so that, assuming the horizontal direction is 0°, the reduction zone is arranged relative to the oxidation zone at an elevation of 0° or larger and 45° or smaller.

7. The gas chromatograph system according to claim 6, wherein the inside of the flow channel member serves as the reduction zone, with a catalyst having a reduction activity provided to the inner surface of the flow channel member.

8. The gas chromatograph system according to claim 5, further comprising a body having the column housed therein, wherein the redox unit is arranged on the side face of the column oven body, and the flow channel extends outwardly from the side face of the column oven body.

* * * * *